D. B. LEVY.
PASTRY FORMING DEVICE.
APPLICATION FILED AUG. 21, 1920.
1,376,711.
Patented May 3, 1921.
2 SHEETS—SHEET 2.
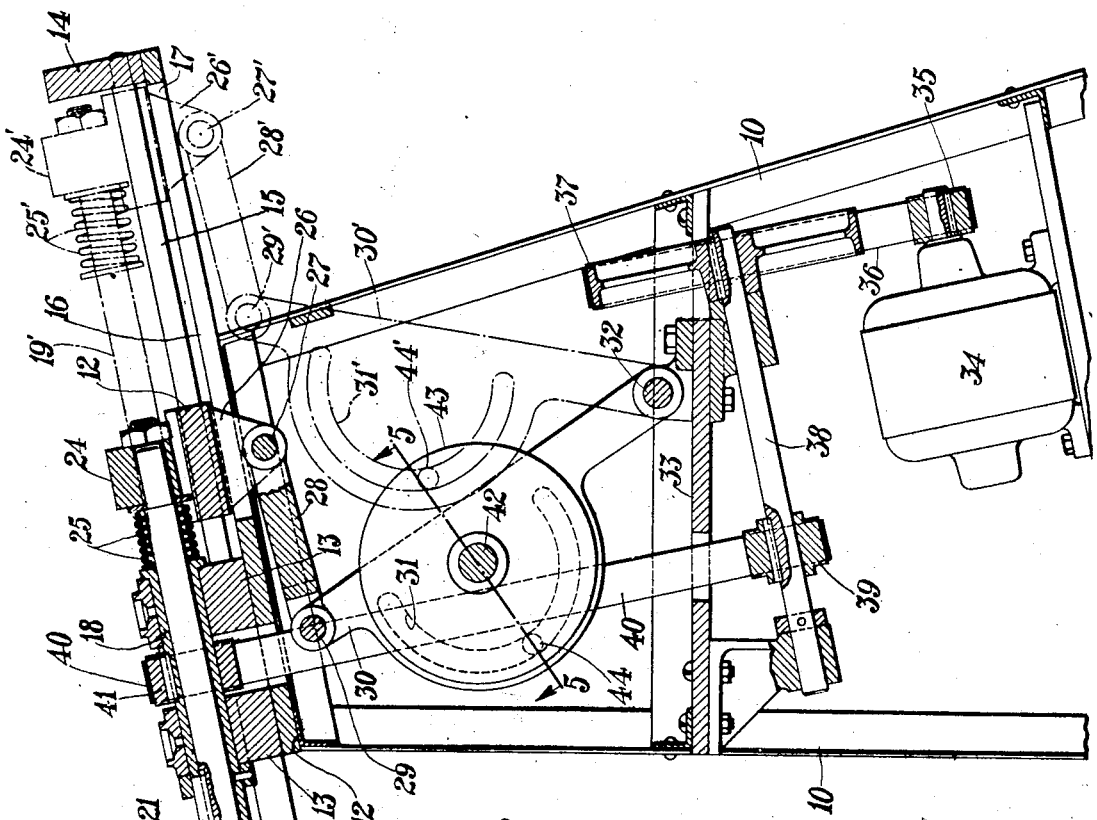
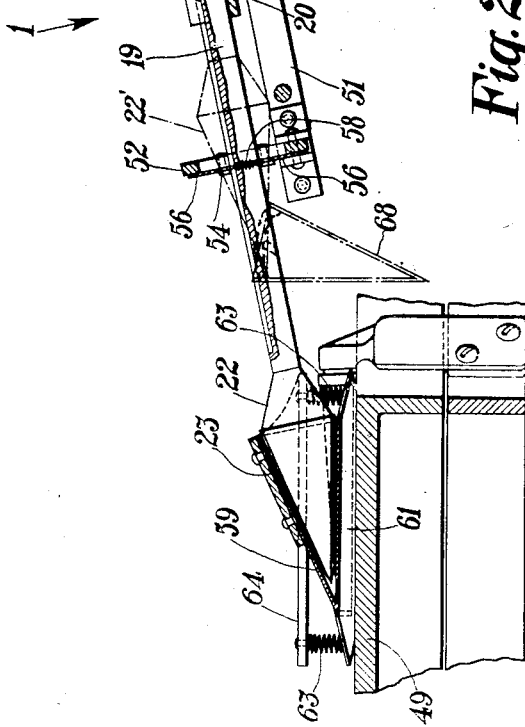
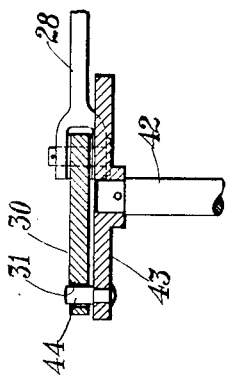
Inventor
Daniel B. Levy
By his Attorney

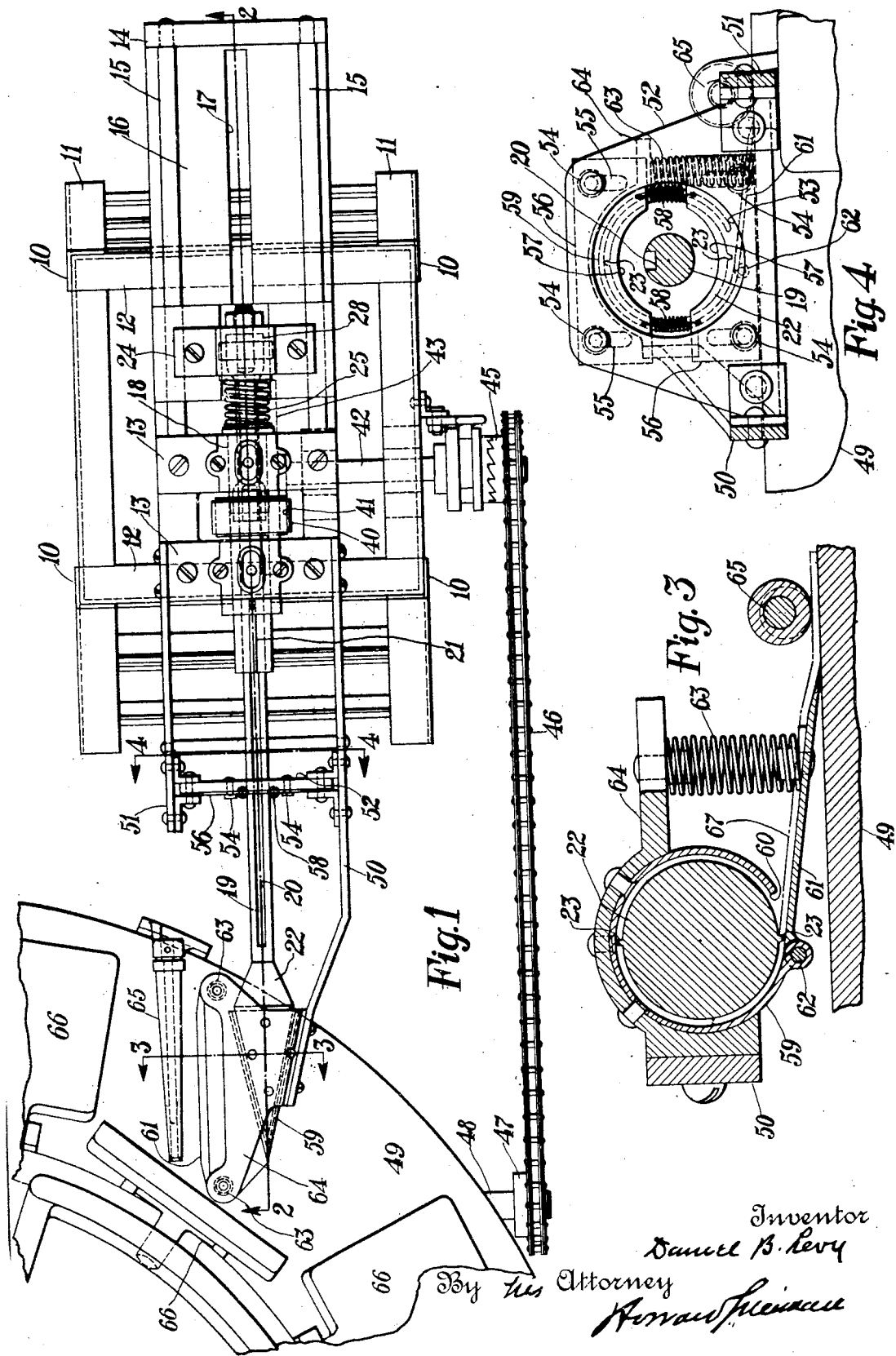

UNITED STATES PATENT OFFICE.

DANIEL B. LEVY, OF NEW YORK, N. Y., ASSIGNOR TO UNEEDA CONE CO., OF NEW YORK, N. Y.

PASTRY-FORMING DEVICE.

1,376,711.     Specification of Letters Patent.     Patented May 3, 1921.

Application filed August 21, 1920. Serial No. 405,052.

*To all whom it may concern:*

Be it known that I, DANIEL B. LEVY, a citizen of the United States, residing in New York city, county of New York, borough of Manhattan, and State of New York, have invented certain new and useful Improvements in Pastry-Forming Devices, of which the following is a full, clear, and exact specification.

My invention relates to pastry shaping devices and refers particularly to pastry devices in the form of cones.

The object of my invention is the production of cone-shaped receptacles of baked dough suitable for containing ice-cream.

In the production of pastry of the described shape, it is usual to deposit the dough, or batter, upon a heated revolving plate, a smaller plate being automatically positioned upon the dough to facilitate the baking operation, the smaller plate being automatically lifted when the dough is baked. This approximately round piece of baked dough is then removed by hand from the heated revolving plate and formed by hand into a cone shape.

This process has many practical objections; great difficulty is experienced in retaining labor as the hot dough forms burn the hands of the operator and, on account of this heated condition of the baked dough, proper care cannot be taken in the formation of the cones, resulting in irregular and uncertain production and great waste. The output is small, being limited to the ability of the operator to form the cones, and the expense is further increased by the necessity of having skilled workmen.

Pastry cones are sometimes made by a molding process but this method has many of the above objections and additional ones incident to mold formations.

The device of my invention overcomes all of these difficulties and presents a means for the maximum production of uniform cones by unskilled labor with a minimum of loss and expense.

The production of cones by my devices from the formation of the dough, or batter, to the delivering of the finished baked cone is automatic and eliminates entirely all hand work.

The rapidity of production is limited only by the ability of the baking plates, as my device will form and deliver cones as rapidly as they can be baked.

A consideration of my drawings and specification will demonstrate the economy, effectiveness and efficiency of my device for the production of cone-shaped pastry forms.

In the accompanying drawings illustrating one form of the device of my invention, similar parts are designated by similar numerals:—

Figure 1 is a top plan view of one form of my device taken in the direction of the arrow 1 of Fig. 2.

Fig. 2 is a section through the line 2—2 of Fig. 1, showing in addition the position of the cam movement at its farthest position.

Fig. 3 is a section through the line 3—3 of Fig. 1.

Fig. 4 is a section through the line 4—4 of Fig. 1.

Fig. 5 is a section through the line 5—5 of Fig. 2.

The particular form of the device of my invention shown in the accompanying drawings comprises an upright support formed by a series of members 10, 10, carrying the frame members 11, 11, 12, 12. The frame work supports two shaft bearings 13, 13. The frame also supports the end member 14, which end member and one of the bearings 13 act as end supports for two parallel spaced fixed rods 15, 15. The bottom plate 16, carried by the frame work, and the end 14, has an elongated opening 17 for purposes to be described later. A revoluble sleeve 18 is carried by the bearings 13, 13, within which is a shaft 19, the shaft 19 having a longitudinal recess 20, into which the key 21 of the sleeve 18 fits. The shaft 19 will therefore revolve with the sleeve 18, and is capable of longitudinal movement through the sleeve during the revolutions. One end of the shaft 19 carries an integral fixed conical head 22, which has a series of outwardly extended ridges 23, 23. The other end of the shaft 19 is fixedly attached to the carriage 24 which has two openings through which the rods 15, 15 pass, and hence, act as guides for the longitudinal movement of the carriage 24. A coiled spring 25 surrounds the shaft, is attached to the carriage 24 and is capable of abutment upon one of the bearings 13. The extended portion 26 of the carriage extends through the opening 17 of the bottom plate 16 and pivotally carries at 27 the link 28, the other end of which is pivotally connected at 29 with a cam member 30, having the cam runway 31. The cam 30 is pivotally attached at 32 to the frame work 33. A motor 34 revolves the pulley 35, connected by means of the belt 36 to the pulley 37, fixedly attached to the shaft 38 carrying the fixedly attached pulley 39, which, in turn, is connected by means of the belt 40 to the pulley 41 fixedly attached to the sleeve 18. A shaft 42 carries a fixedly attached wheel 43 which has an extended pin 44 engaged within the cam runway 31 of the cam 30. The shaft 42 carries the pulley 45, which is connected by means of the belt 46 to the pulley 47 carried by the shaft 48, which is operated by the revoluble mechanism of the cone baking table 49.

It is evident, from the above, that the revolution of the motor 34 will revolve the sleeve 18 and the shaft 19, and the revolution of the shaft 42 will cause the wheel 43 to revolve, the pin 44 of which will give the cam 30 an oscillating movement which, through the medium of the link 28 and the carriage 24, will move the revolving shaft 19 longitudinally to and fro. The full lines in Fig. 2 show one position of the cam, the carriage and the shaft, and the dotted lines, with prime numerals, showing the cam, the carriage and the shaft in their other extreme positions.

Carried by the frame members 50 and 51 is an upright member 52, having an opening 53 and extended pins 54, 54, 54, 54. These pins 54, 54 pass through slots 55, 55 of two plates 56, 56 and maintain them in position while allowing of their vertical movement. A semi-circular opening 57 is made in each plate 56 to form a practical circular opening between the two plates. Spiral springs 58, 58 connect the two plates 56, 56. The openings in the two plates 56, 56 are of such a size that when the shaft 19 is withdrawn, they will rise over the greatest diameter of the conical head 22 and then pass downwardly toward the point thereof during the further movement of the shaft, the reasons for such movement being described later A stationary hollow cone 59, having a longitudinal opening 60, is positioned slightly above the baking table 49. This cone 59 is of such a size, shape and position that the cone member 22 of the shaft 19 will enter therein and be spaced slightly therefrom at the point of farthest movement of the cone 22. A plate 61 is hinged at 62 to the cone 59 and rests upon the table 49. The plate 61 is maintained in contact with the table 49 by means of the springs 63, 63 between the plate 61 and the member 64 carried by the cone 59.

A revoluble roller 65 abuts upon the face of the table 49 and is made to revolve by the revolution of the table.

The cone baking table 49, as shown, is the ordinarily employed table for baking cone dough into circular flat forms prior to the cone formation, the cone being baked between the heated table and the automatically rising and falling plates 66, 66.

The operation of the device is as follows:—

Cone dough is dropped upon the heated table 49 and baked between the table and a plate 66. When the baked plate dough reaches the position shown in Fig. 1, the plate 66 rises and leaves the dough 67 upon the table, the revolution of which carries it beneath the roller 65, which keeps it in flat condition to be passed over the plate 61 into the cone 59 and between the interior face of the cone 59 and the exterior face of the cone 22. This is accomplished by timing the mechanism so that at the moment of entrance of dough into the cone 59, the cone 22 is inserted therein and its revolution causes the ridges 23, 23 of the cone 22 to engage the dough and bring it into placement between the two cones, thus giving a cone-like shape. It is desirable to hold the cone in this position for a very short period of time, in order that it may be firmly fixed in its cone shape and the particular method of accomplishing this, as shown in the drawings, comprises having the spring 25 of such strength that when in its greatest compression it will prevent the revolution of the shaft 19 by its abutment upon a bearing 13, as previously described, and cause the belt 40 to slip over the pulleys 39 and 41 and thus hold the shaft 19 from revoluble movement until the compression is slightly removed by the cam movement.

The shaft 19 is now withdrawn, thus removing the cone 22 with its attached baked cone from within the cone 59, the further movement of the shaft 19 carries the cone 22 through the opening 57, 57 of the members 56, 56, which first ride upwardly over the cone 22 and, in their descent upon the other side of the cone, they push the baked cone 68 from engagement with the cone 22 and allow it to fall into a suitable receptacle.

The various members and elements of the mechanism are so sized and placed that the above described operation takes place as each baked flat dough piece presents itself before the roller 65.

It is evident, from the above, that the device automatically takes each flat piece of baked dough from the heated table, turns it into cone-shaped form and releases it in finished condition.

I do not limit myself to the particular size, shape, number or arrangement of parts, or the particular means of accomplishing the desired results as shown and described, all of which may be varied without going beyond the scope of my invention as shown, described and claimed.

What I claim is:—

1. In a pastry-forming device, in combination, a revoluble sleeve, means for revolving the sleeve, a shaft within the sleeve, means whereby the shaft may have a longitudinal movement through the sleeve, means for moving the shaft through the sleeve, a shaping member upon one end of the shaft, a hollow shaping member capable of receiving the shaft shaping member, means for introducing baked dough between the two shaping members, means for withdrawing the shaft shaping member carrying the dough form and means for freeing the dough form from the shaping member.

2. In a pastry-forming device, in combination, a revoluble sleeve, means for revolving the sleeve, a shaft within the sleeve, means whereby the shaft may have a longitudinal movement through the sleeve, means for moving the shaft through the sleeve, a shaping member upon one end of the shaft, a hollow shaping member having a longitudinal opening for the introduction of baked dough, means for introducing baked dough between the two shaping members, means for withdrawing the shaft shaping member carrying the dough form and means for freeing the dough form from the shaping member.

3. In a pastry-forming device, in combination, a revoluble sleeve, means for revolving the sleeve, a shaft within the sleeve, means whereby the shaft may have a longitudinal movement through the sleeve, means for moving the shaft through the sleeve, a shaping member upon one end of the shaft, a hollow shaping member having a longitudinal opening for the introduction of baked dough, means whereby the revolution of the shaft shaping member within the hollow shaping member will introduce baked dough between the two shaping members, means for withdrawing the shaft shaping member carrying the dough form and means for freeing the dough form from the shaping member:

4. In a pastry-forming device, in combination, a revoluble sleeve, means for revolving the sleeve, a shaft within the sleeve, means whereby the shaft may have a longitudinal movement through the sleeve, means whereby the shaft will have a reciprocating movement through the sleeve, a shaping member upon one end of the shaft, a hollow shaping member capable of receiving the shaft shaping member, means for introducing baked dough between the two shaping members, means for withdrawing the shaft shaping member carrying the dough form and means for freeing the dough form from the shaping member.

5. In a pastry-forming device, in combination, a revoluble sleeve, means for revolving the sleeve, a shaft within the sleeve, means whereby the shaft may have a longitudinal movement through the sleeve, means whereby the shaft will have a reciprocating movement through the sleeve, a shaping member upon one end of the shaft, a hollow shaping member having a longitudinal opening for the introduction of baked dough, means whereby the revolution of the shaft shaping member within the hollow shaping member will introduce baked dough between the two shaping members, means for withdrawing the shaft shaping member carrying the dough form and means for freeing the dough form from the shaping member.

6. In a pastry-forming device, in combination, a revoluble sleeve, means for revolving the sleeve, a shaft within the sleeve, means whereby the shaft may have a longitudinal movement through the sleeve, means for moving the shaft through the sleeve, a shaping member upon one end of the shaft, a series of extended members carried by the shaft shaping member, a hollow shaping member capable of receiving the shaft shaping member, means for introducing baked dough between the two shaping members, means for withdrawing the shaft shaping member carrying the dough form and means for freeing the dough form from the shaping member.

7. In a pastry-forming device, in combination, a revoluble sleeve, means for revolving the sleeve, a shaft within the sleeve, means whereby the shaft may have a longitudinal movement through the sleeve, means whereby the shaft will have a reciprocating movement through the sleeve, a shaping member upon one end of the shaft, a series of extended members carried by the shaft shaping member, a hollow shaping member having a longitudinal opening for the introduction of baked dough, means whereby the revolution of the shaft shaping member within the hollow shaping member will introduce baked dough between the two shaping members, means for withdrawing the shaft shaping member carrying the dough form and means for freeing the dough form from the shaping member.

8. In a pastry-forming device, in combination, a revoluble sleeve, means for revolving the sleeve, a shaft within the sleeve, means whereby the shaft may have a longitudinal movement through the sleeve, means for moving the shaft through the sleeve, a shaping member upon one end of the shaft, a hollow shaping member having a longitudinal opening for the introduction of baked dough, means whereby the revolution of the shaft shaping member within the hollow shaping member will introduce baked dough between the two shaping members, means whereby the revolution of the shaft shaping member will be momentarily interrupted while it is inserted within the hollow shaping member, means for withdrawing the shaft shaping member carrying the dough form and means for freeing the dough form from the shaping member.

9. In a pastry-forming device, in combination, a revoluble sleeve, means for revolving the sleeve, a shaft within the sleeve, means whereby the shaft may have a longitudinal movement through the sleeve, means whereby the shaft will have a reciprocating movement through the sleeve, a shaping member upon one end of the shaft, a series of extended members carried by the shaft shaping member, a hollow shaping member having a longitudinal opening for the introduction of baked dough, means whereby the revolution of the shaft shaping member within the hollow shaping member will introduce baked dough between the two shaping members, means whereby the revolution of the shaft shaping member will be momentarily interrupted while it is inserted within the hollow shaping member, means for withdrawing the shaft shaping member carrying the dough form and means for freeing the dough form from the shaping member.

10. In a pastry-forming device, in combination, a revoluble sleeve, means for revolving the sleeve, a shaft within the sleeve, means whereby the shaft may have a longitudinal movement through the sleeve, means for moving the shaft through the sleeve, a shaping member upon one end of the shaft, a hollow shaping member capable of receiving the shaft shaping member, a revoluble dough baking table, a member pivotally connected to the hollow shaping member and resting upon the table, means for withdrawing the shaft shaping member carrying the dough form and means for freeing the dough form from the shaping member.

11. In a pastry-forming device, in combination, a revoluble sleeve, means for revolving the sleeve, a shaft within the sleeve, means whereby the shaft may have a longitudinal movement through the sleeve, means for moving the shaft through the sleeve, a shaping member upon one end of the shaft, a hollow shaping member capable of receiving the shaft shaping member, a revoluble dough baking table, a member pivotally connected to the hollow shaping member and resting upon the table, a revoluble roller resting upon the table situated immediately before the pivotal member, means for withdrawing the shaft shaping member carrying the dough form and means for freeing the dough form from the shaping member.

12. In a pastry-forming device, in combination, a revoluble sleeve, means for revolving the sleeve, a shaft within the sleeve, means whereby the shaft may have a longitudinal movement through the sleeve, means whereby the shaft will have a reciprocating movement through the sleeve, a shaping member upon one end of the shaft, a series of extended members carried by the shaft shaping member, a hollow shaping member having a longitudinal opening for the introduction of baked dough, means whereby the revolution of the shaft shaping member within the hollow shaping member will introduce baked dough between the two shaping members, a revoluble dough baking table, a member pivotally connected to the hollow shaping member and resting upon the table, means for withdrawing the shaft shaping member carrying the dough form and means for freeing the dough form from the shaping member.

13. In a pastry-forming device, in combination, a revoluble sleeve, means for revolving the sleeve, a shaft within the sleeve, means whereby the shaft may have a longitudinal movement through the sleeve, means whereby the shaft will have a reciprocating movement through the sleeve, a shaping member upon one end of the shaft, a series of extended members carried by the shaft shaping member, a hollow shaping member having a longitudinal opening for the introduction of baked dough, means whereby the revolution of the shaft shaping member within the hollow shaping member will introduce baked dough between the two shaping members, means whereby the revolution of the shaft shaping member will be momentarily interrupted while it is inserted within the hollow shaping member, a revoluble dough baking table, a member pivotally connected to the hollow shaping member and resting upon the table, a revoluble roller resting upon the table situated immediately before the pivotal member, means for withdrawing the shaft shaping member carrying the dough form and means for freeing the dough form from the shaping member.

14. In a pastry-forming device, in combination, a revoluble sleeve, means for revolving the sleeve, a shaft within the sleeve, means whereby the shaft may have a longitudinal movement through the sleeve, means connected with a revolving baking table whereby the shaft will have a reciprocating movement through the sleeve, a revoluble dough baking table, a shaping member upon one end of the shaft, a hollow shaping member capable of receiving the shaft shaping member, means for introducing baked dough between the two shaping members and means for withdrawing the shaft shaping member carrying the dough form.

15. In a pastry-forming device, in combination, a revoluble sleeve, means for revolving the sleeve, a shaft within the sleeve, means whereby the shaft may have a longitudinal movement through the sleeve, means connected with a revolving baking table whereby the shaft will have a reciprocating movement through the sleeve, a revoluble dough baking table, a member pivotally connected to the hollow shaping member and resting upon the table, a shaping member upon one end of the shaft, a hollow shaping member capable of receiving the shaft shaping member, means for introducing baked dough between the two shaping members and means for withdrawing the shaft shaping member carrying the dough form.

16. In a pastry-forming device, in combination, a revoluble sleeve, means for revolving the sleeve, a shaft within the sleeve, means whereby the shaft may have a longitudinal movement through the sleeve, means connected with a revolving baking table whereby the shaft will have a reciprocating movement through the sleeve, a shaping member upon one end of the shaft, a series of extended members carried by the shaft shaping member, a hollow shaping member having a longitudinal opening for the introduction of baked dough, means whereby the revolution of the shaft shaping member within the hollow shaping member will introduce baked dough between the two shaping members, means whereby the revolution of the shaft shaping member will be momentarily interrupted while it is inserted within the hollow shaping member, a revoluble dough baking table, a member pivotally connected to the hollow shaping member and resting upon the table, a revoluble roller resting upon the table situated immediately before the pivotal member, means for withdrawing the shaft shaping member carrying the dough form and means for freeing the dough form from the shaping member.

Signed at New York city in the county of New York and State of New York, this 18th day of August, 1920.

DANIEL B. LEVY.